(12) United States Patent
Ishikawa et al.

(10) Patent No.: US 7,640,094 B2
(45) Date of Patent: Dec. 29, 2009

(54) DIESEL ENGINE

(75) Inventors: Naoya Ishikawa, Fujisawa (JP); Naoki Shimazaki, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 285 days.

(21) Appl. No.: 11/664,396

(22) PCT Filed: Sep. 28, 2005

(86) PCT No.: PCT/JP2005/017798

§ 371 (c)(1),
(2), (4) Date: Mar. 30, 2007

(87) PCT Pub. No.: WO2006/038500

PCT Pub. Date: Apr. 13, 2006

(65) Prior Publication Data

US 2008/0177457 A1 Jul. 24, 2008

(30) Foreign Application Priority Data

Oct. 1, 2004 (JP) ............................. 2004-290332
Nov. 18, 2004 (JP) ............................. 2004-334582

(51) Int. Cl.
*G06F 19/00* (2006.01)
*F02F 3/26* (2006.01)
*F02B 31/04* (2006.01)
*F02M 25/07* (2006.01)
*F01N 3/10* (2006.01)

(52) U.S. Cl. ..................... 701/105; 123/276; 123/306; 123/568.21; 60/299

(58) Field of Classification Search ................. 123/276, 123/295, 299, 300, 305, 306, 478, 480, 568.11, 123/568.14, 568.21; 701/101–105, 108, 701/115; 60/274, 285, 299
See application file for complete search history.

(56) References Cited

U.S. PATENT DOCUMENTS 5,357,924 A * 10/1994 Onishi ........................ 123/276

(Continued)

FOREIGN PATENT DOCUMENTS

EP 1 308 617 A1 10/2002

(Continued)

OTHER PUBLICATIONS

Supplementary European Search Report for Serial No. EP 05 78 7870 dated Dec. 10, 2008.
Search Report for PCT/JP2005/017798 dated Dec. 8, 2005.

*Primary Examiner*—Willis R Wolfe, Jr.
(74) *Attorney, Agent, or Firm*—McCormick, Paulding & Huber LLP

(57) ABSTRACT

A diesel engine having: a reentrant type cavity 11 depressed in the top of a piston 4; fuel injection means 9 that injects fuel towards the cavity 11; exhaust gas recirculation means 19 that recirculates a part of the exhaust gas into a combustion chamber; and a control device 26 that controls the fuel injection timing by the fuel injection means 9 and the EGR ratio or EGR quantity by the exhaust gas recirculation means 19, wherein in a predetermined operating region, the control device 26 implements premixed combustion by controlling the fuel injection timing by the fuel injection means 9 so that fuel injection is completed before the compression top dead center of the piston 4 and so that all the injected fuel enters the cavity 11, as well as controlling the EGR ratio or the EGR quantity by the exhaust gas recirculation means 19 so that the fuel injected by the fuel injection means 9 is ignited near the compression top dead center of the piston 4 after injection of fuel is completed. In this way, favorable premixed combustion can be implemented, and favorable combustion can be ensured even when the combustion is switched to diffuse combustion.

8 Claims, 6 Drawing Sheets

U.S. PATENT DOCUMENTS

| | | | |
|---|---|---|---|
| 6,158,413 A * | 12/2000 | Kimura et al. | 123/306 |
| 6,612,292 B2 * | 9/2003 | Shirakawa | 123/501 |
| 6,640,772 B2 | 11/2003 | Gatellier et al. | 123/298 |
| 6,782,696 B2 * | 8/2004 | Shigahara et al. | 60/285 |
| 6,840,211 B2 * | 1/2005 | Takahashi | 123/299 |
| 6,932,048 B2 * | 8/2005 | Shimazaki | 123/299 |
| 2003/0047159 A1 | 3/2003 | Shimazaki | 123/276 |
| 2004/0154582 A1 | 8/2004 | Shimazaki | 123/299 |

FOREIGN PATENT DOCUMENTS

| | | |
|---|---|---|
| EP | 1 445 461 A2 | 2/2004 |
| JP | 2002-227650 | 8/2002 |
| JP | 2002-349267 | 12/2002 |
| JP | 2002-371831 | 12/2002 |
| JP | 2003-083070 | 3/2003 |
| JP | 2003-083119 | 3/2003 |
| JP | 2004-239208 | 8/2004 |
| WO | 01/38704 A1 | 5/2001 |
| WO | 2004/057167 A1 | 7/2004 |

* cited by examiner

DIESEL ENGINE

CROSS REFERENCE TO RELATED APPLICATIONS

This application is entitled to the benefit of and incorporates by reference essential subject matter disclosed in International Patent Application No. PCT/JP2005/017798 filed on Sep. 28, 2005 and Japanese Patent Application No. 2004-290332 filed Oct. 1, 2004 and Japanese Patent Application No. 2004-334582 filed Nov. 18, 2004.

TECHNICAL FIELD

The present invention relates to a diesel engine that realizes premixed combustion in a predetermined operating region.

BACKGROUND OF THE INVENTION

In diesel engines that directly inject fuel into the cylinders, the fuel was normally injected near the compression top dead center of the piston when there was high temperature and high pressure within the cylinder. In this case, ignition started and flames were formed while the fuel was being injected, and combustion continued by supplying subsequent fuel to the flames. Combustion of this form, in which ignition started during injection of the fuel in this way, is normally known as diffuse combustion, but diffuse combustion has problems of generation of NOx, smoke, and the like.

Therefore in recent years, a form of combustion that is known as premixed combustion has been proposed to be realized in which fuel is injected earlier than the compression top dead center of the piston, and after fuel injection is complete, the premixed fuel-air mixture is ignited (see Japanese Patent Application Laid-open No. 2003-83119, Japanese Patent Application Laid-open No. 2002-227650).

In premixed combustion, the premixed fuel-air mixture is ignited after a certain period has passed after completion of fuel injection, so the premixed fuel-air mixture has sufficiently diluted and homogenized by the time ignition occurs. Therefore, the local combustion temperature is reduced, the quantity of NOx emissions is reduced, and combustion under insufficient air is avoided, so smoke generation is also reduced.

SUMMARY OF THE INVENTION

However, in premixed combustion, the fuel is injected when the piston is in a relatively low position, so when attempting to realize premixed combustion in a normal diesel engine that has been designed on the assumption of diffuse combustion, there is a risk that the injected fuel will adhere to the side walls of the cylinder, and fuel that has impacted the top of the piston and rebounded will adhere to the bottom surface of the cylinder head, and generate unburnt HC.

Therefore, as shown in FIG. 7, in diesel engines that realize premixed combustion, it has been proposed that the cavity CA formed in the top of the piston P is an open type cavity that opens out towards the aperture (the topmost end), and the fuel injection angle α of the injector I is narrower than the normal injector (see Japanese Patent Application Laid-open No. 2003-83119, Japanese Patent Application Laid-open No. 2002-227650). In this way, the injected fuel F enters into the cavity CA, and does not adhere to the side walls of the cylinder CL or the bottom surface of the cylinder head CH, so it is possible to reduce the occurrence of unburnt HCs.

However, diesel engines using this open-type cavity CA and an injector I with a narrow injection angle α had the following problems.

1) The cavity CA is an open-type cavity, so swirl formed within the cavity CA is difficult to maintain within the cavity CA. As a result, dilution and homogenization due to mixing of the premixed fuel-air mixture is insufficient, which can result in reduction in output and deterioration of the exhaust gases.

2) If premixed combustion is implemented in the high load region in which the fuel injection quantity is large, knocking can occur. Therefore in the high load region, it is necessary to switch to diffuse combustion. However, the injection angle α of the injectors I is narrow, so when fuel is injected near the compression top dead center of the piston P in order to implement diffuse combustion, the injected fuel impacts the bottom surface (towards the center) of the cavity CA, so smoke is generated. In other words, diesel engines using open type cavities CA and injectors I with narrow injection angles α are designed with the emphasis on premixed combustion, and have problems implementing diffuse combustion.

Therefore, it is an object of the present invention to provide a diesel engine that is capable of realizing good premixed combustion, and is capable of maintaining good combustion when switching to diffuse combustion.

To achieve the above object, an embodiment of the invention comprises a reentrant type cavity depressed in the top of a piston, fuel injection means that inject fuel towards the cavity, exhaust gas recirculation means that recirculate a part of the exhaust gas into a combustion chamber, and a control device that controls a fuel injection timing by the fuel injection means and an EGR ratio or EGR quantity by the exhaust gas recirculation means, wherein when an engine operating condition is in a predetermined operating region, the control device implements premixed combustion by controlling the fuel injection timing by the fuel injection means so that fuel injection is completed before a compression top dead center of the piston and so that all the injected fuel enters the cavity, as well as controlling the EGR ratio or the EGR quantity by the exhaust gas recirculation means so that the fuel injected by the fuel injection means is ignited near the compression top dead center of the piston after injection of fuel is completed.

According to an aspect of the invention, when the premixed combustion is implemented, the control device controls the EGR ratio by the exhaust gas recirculation means to be 50% or higher.

According to another aspect of the invention, an injection angle of the fuel injection means is set within a range of 140° to 165°.

According to an additional aspect of the invention, when the premixed combustion is implemented, the control device controls a fuel injection start timing by the fuel injection means to be within a range of 5° to 35° BTDC.

According to a further aspect of the invention, when the engine operating condition is outside the predetermined operating region, the control device controls the fuel injection timing by the fuel injection means to be near the compression top dead center of the piston to implement diffuse combustion.

According to a further aspect the of invention, an injection angle of the fuel injection means is set so that fuel injected near the compression top dead center of the piston reaches the internal wall of the cavity on the outside in a radial direction from the lowest position of the cavity.

According to an additional aspect of the invention a diesel engine further comprises an exhaust gas post-processing device having a catalyst provided in an exhaust passage, additive addition means that adds additive to an exhaust gas flowing in the exhaust passage upstream of the catalyst, and additive storage means that stores additive that is supplied to the additive addition means; and additive remaining quantity detection means that detects the quantity of additive stored in the additive storage means, wherein when a value detected by the additive remaining quantity detection means is equal to or less than a first predetermined value, the control device implements the premixed combustion even if the engine operation condition is outside the predetermined operating region.

According to another aspect of the invention, when the value detected by the additive remaining quantity detection means is equal to or less than the first predetermined value, the control device limits a required torque determined based on an engine rotation speed and an accelerator opening degree to be equal to or less than a maximum required torque in the region in which the premixed combustion is implemented.

According to a further aspect of the invention, when the value detected by the additive remaining quantity detection means is equal to or less than the first predetermined value, the control device limits a fuel injection quantity determined based on an engine rotation speed and an accelerator opening degree to be equal to or less than a maximum fuel injection quantity in the region in which the premixed combustion is implemented.

According to an additional aspect of the invention, warning means which can be activated by the control device is further provided, and when the value detected by the additive remaining quantity detection means is equal to or less than a second predetermined value that is set to a value equal to or greater than the first predetermined value, the control device activates the warning means.

According to a further aspect of the invention, the catalyst of the exhaust gas post-processing device is a selective catalytic reduction catalyst, and the additive is ammonia solution, urea solution, or liquid ammonia.

According to a further aspect of the invention, an inlet air port of a high swirl type, or a swirl generation device provided in the inlet air port is comprised to swirl an inlet air brought into the combustion chamber.

According to the present invention, good premixed combustion can be realized, and good combustion can be maintained even when switching to diffusion combustion.

BEST MODE FOR CARRYING OUT THE INVENTION

The following is a detailed explanation of the best mode for implementing the present invention based on the attached drawings.

Figure 1:
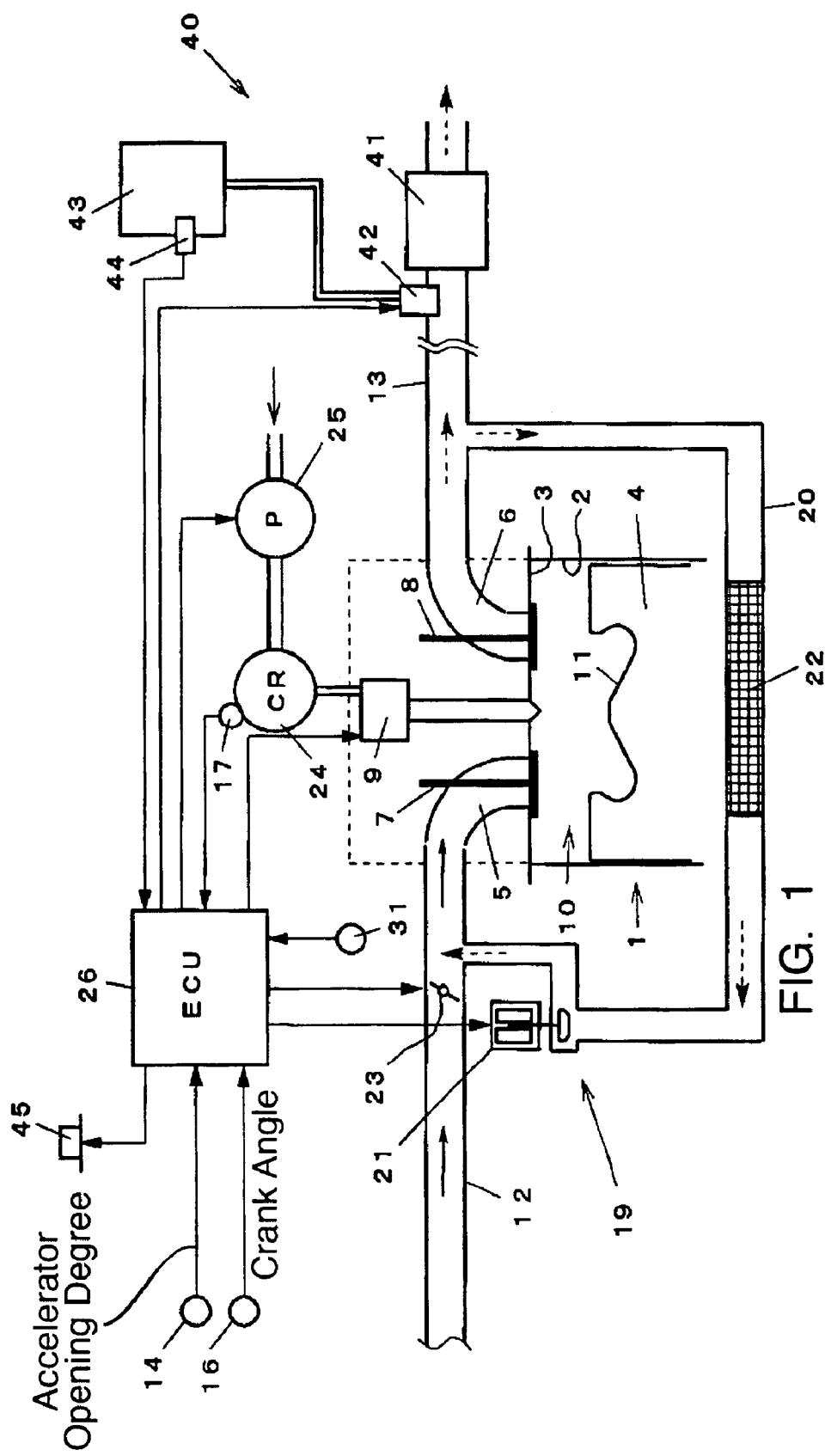
FIG. 1 is a schematic diagram of a diesel engine according to one embodiment of the present invention.

FIG. 1 is a schematic diagram of a diesel engine (hereafter simply referred to as the engine) according to an embodiment of the present invention. FIG. 1 shows only one cylinder, but of course there may be multiple cylinder.

In the figure, 1 is the main engine body, which comprise a cylinder 2, a cylinder head 3, a piston 4, an air inlet port 5, an exhaust port 6, an air inlet valve 7, an exhaust valve 8, and an injector 9 (fuel injection means), and so on. A combustion chamber 10 is formed by the space enclosed by the cylinder 2, the cylinder head 3, and the piston 4. A cavity 11 is formed as a depression in the top of the piston 4, and the injector 9 that is provided facing the combustion chamber 10 directly injects fuel towards the cavity 11.

The cavity 11 and the injector 9 of the engine according to the present embodiment are the same as those for a normal diesel engine designed on the assumption of realizing diffuse combustion.

Figure 3A:
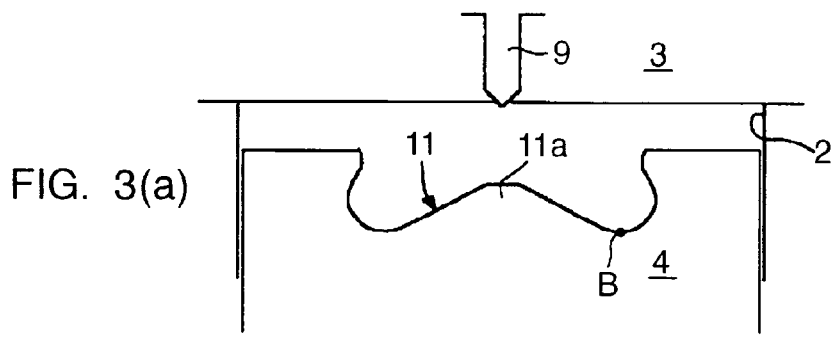
FIG. 3(a) is a diagram showing the position of the piston just before the fuel is injected from the injector.

Specifically, as shown in FIG. 3(a), the cavity 11 of the present embodiment is a reentrant cavity with the largest area perpendicular to the axis of the piston 4 located below the top of the piston 4 (in the present embodiment the part with the smallest area perpendicular to the axis of the piston 4) (in other words, the aperture has a shape that is narrowed down), and with a convex part 11a that rises up formed over the center of the bottom of the cavity 11. The injector 9 is disposed substantially concentric with the cylinder 2, and injects fuel at an injection angle β (see FIG. 3(c)) from a plurality of injection holes. The injection angle β of the injector 9 is the same as the injection angle of a normal engine (that realizes diffuse combustion), and in the present embodiment is set within a range of 140° to 165°.

Returning to FIG. 1 the injector 9 is connected to a common rail 24, and high pressure fuel that is stored in the common rail 24 is constantly supplied to the injector 9. A high pressure supply pump 25 supplies fuel under pressure to the common rail 24. An air inlet pipe 12 and an exhaust pipe 13 are connected to the air inlet port 5 and the exhaust port 6 respectively.

The engine according to the present embodiment further includes an EGR device 19 (exhaust gas recirculation means) that recirculates a part of the exhaust gas within the exhaust pipe 13 to the combustion chamber 10.

The EGR device 19 includes an EGR passage 20 that connects the air inlet pipe 12 and the exhaust pipe 13, an EGR valve 21 that modifies the area of the passage of the EGR passage 20 to adjust the EGR ratio and EGR quantity of the inlet gas, and an EGR cooler 22 that cools the EGR gas (exhaust gas) at the upstream of the EGR valve 21. By increasing the degree of opening of the EGR valve 21, the EGR ratio and EGR quantity of the inlet gas can be increased, and conversely by reducing the degree of opening of the EGR valve 21, the EGR ratio and EGR quantity of the inlet gas can be reduced.

An inlet air throttle valve 23 is provided in the inlet pipe 12 upstream of the connection with the EGR pipe 20 to throttle the inlet air as appropriate. By opening and closing the inlet air throttle valve 23, the quantity or percentage of inlet air (new air) as a percentage of the total inlet gas can be adjusted, so the EGR ratio can be adjusted. In other words, by increasing the valve degree of opening of the inlet air throttle valve 23, the quantity (percentage) of inlet air is increased, and the EGR ratio and EGR quantity of the inlet gas can be reduced, conversely by reducing the valve degree of opening of the inlet air throttle valve 23, the quantity of inlet air is reduced, and the EGR ratio and EGR quantity of the inlet gas can be increased.

An electronic control unit (hereafter referred to as the ECU) 26 is provided for electronic control of the engine. The ECU 26 (control device) reads the operating conditions of the engine from many types of sensors, and based on the engine operating conditions controls the injector 9, the EGR valve 21, the inlet air throttle valve 23, and so on. These sensors include an accelerator opening degree sensor 14 that detects the degree of opening of the accelerator, a crank angle sensor 16 that detects the phase of the crankshaft (not shown in the drawings) of the engine, in other words crank angle, a common rail pressure sensor 17 that detects the fuel pressure in the common rail 24, and so on, and based on the output signals from these sensors, the ECU 26 determines the actual accelerator opening degree, crank angle, common rail pressure, and so on. Also, the ECU 26 determines the engine load (required torque) based on the value of accelerator opening degree, and calculates the rate of increase in the crank angle with respect to time and determines the engine rotation speed NE.

The ECU 26 turns the injector 9 ON or OFF, so that the injector 9 executes or stops fuel injection. The ECU 26 determines the required torque based on parameters representing the operating conditions of the engine detected by the sensors, in particular the engine rotation speed NE and the accelerator opening degree, based on the required torque, the target values of fuel injection quantity Q and injection timing are determined, when the actual crank angle reaches the target injection timing the injector 9 is turned ON from that timing for a period of time corresponding to the target injection quantity. In this way, it is possible to control the fuel injection based on the actual engine operating conditions. The target injection quantity and target injection timing are determined in advance through actual tests or similar, and the values are stored in the memory within the ECU 26 in map form.

Moreover, feedback control is also carried out for the common rail pressure, namely the injection pressure. In other words, the ECU 26 determines the target value of common rail pressure based on parameters representing the operating conditions of the engine detected by the sensors, in particular the engine rotation speed NE and the required torque (engine load), and controls the degree of opening of an adjustment valve that is not shown in the drawings to control the fuel supply quantity to the common rail 24 from the high pressure supply pump 25 so that the actual common rail pressure approaches the target value.

Figure 2:
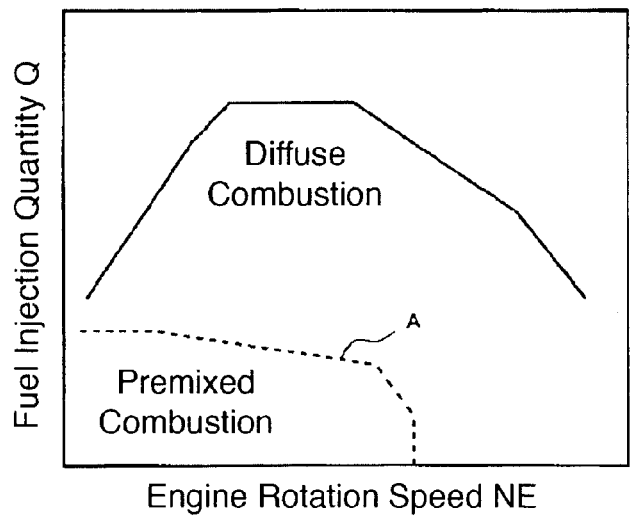
FIG. 2 is a diagram that defines the switching line between premixed combustion and diffuse combustion.

The engine according to the present embodiment realizes premixed combustion in a predetermined operating region as explained in the section "Background of the Invention". Specifically, as shown in FIG. 2, a switching line A for switching between premixed combustion and diffuse combustion based on the engine operating conditions determined from the engine rotation speed NE and the fuel injection quantity Q is input to the ECU 26 in advance, and based on the engine operating conditions (the engine rotation speed NE and the fuel injection quantity Q) determined based on the detected values of the sensors, the ECU 26 controls the injector 9, the EGR valve 21, the inlet air throttle valve 23, and so on, so that the combustion form of either premixed combustion or diffuse combustion is realized. As stated above, the fuel injection quantity Q is determined based on the required torque, so the engine operating conditions may also be considered to be determined based on the engine rotation speed NE and the required torque. As can be seen from FIG. 2, in the engine according to the present embodiment, in the low load region where fuel injection quantity Q is comparatively small (the required torque is comparatively small), premixed combustion is implemented, and in the medium and high load regions where the fuel injection quantity Q is comparatively large (the required torque is comparatively large), diffuse combustion is implemented.

In this way, the engine according to the present embodiment implements premixed combustion using a reentrant type cavity 11 and an injector 9 having a normal injection angle $\beta$. The following is an explanation of the method of implementing premixed combustion by the engine according to the present embodiment.

In the operating region in which premixed combustion is implemented, the ECU 26 controls fuel injection start timing by the injector 9 so that fuel injection is completed before compression top dead center of the piston 4, and to the injection start timing that all the injected fuel enters the cavity 11. This injection start timing is for example within a range of 5 to 35° before top dead center. In other words, to implement premixed combustion, the fuel injection timing is advanced to be before compression top dead center, but the range of the advance angle is limited to that range for which all the injected fuel will enter the cavity 11.

Here, the injection start timing for which all the fuel enters the cavity 11 is specifically explained using FIG. 3.

Figure 3B:
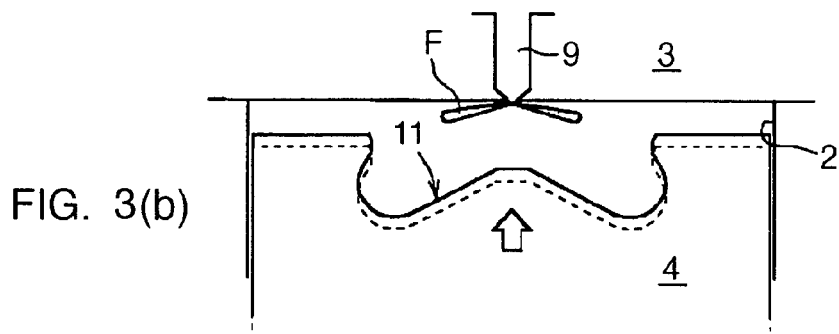
FIG. 3(b) is a diagram showing the relationship between the fuel injected from the injector and the piston, after a predetermined period of time from FIG. 3(a).
Figure 3C:
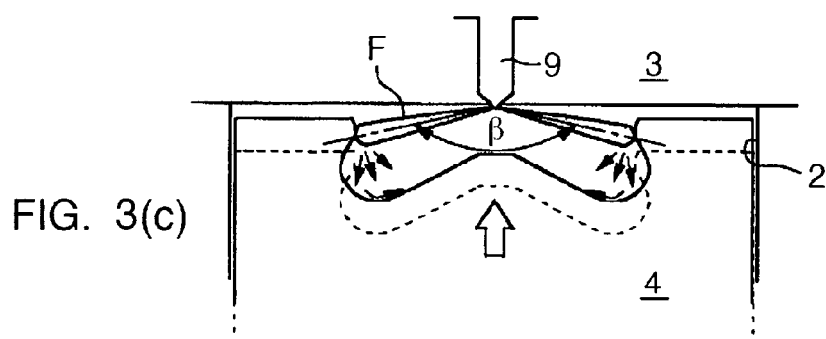
FIG. 3(c) is a diagram showing the relationship between the fuel injected from the injector and the piston, after a predetermined period of time from FIG. 3(b).

FIG. 3(a) shows the condition at the fuel injection start timing (when the injector 9 is turned on), at this time, the piston 4 is positioned below compression top dead center, and fuel is not injected from the injector 9. Then, as shown in FIG. 3(b), the piston 4 rises as time passes, and fuel F starts to be dispersed to the outside in the radial direction from the injector 9. However, at that point of time, the fuel F has not reached the cavity 11 of the piston 4. Then, as shown in FIG. 3(c), when a predetermined period of time has passed after the start of fuel injection, the fuel F impacts the top portion of the side wall of the cavity 11. At this time, if the impact position of the fuel F is appropriate, all the injected fuel F will flow into the cavity 11 as shown in the figure. In this way, the injection timing set in the present embodiment is the injection timing so that all the fuel F is supplied within the cavity 11. Conversely, an injection timing for which part of the fuel that impacts the cavity 11 is reflected upwards and adheres to the bottom surface of the cylinder head 3 is not set in the present embodiment. Also, at the time when fuel injection is fully completed, the piston 4 is positioned below compression top dead center.

The suitable impact position of the fuel F is determined from the shape of the cavity 11, the injection angle $\beta$ of the injector 9, and so on, so suitable injection start timing based on suitable impact positions and the piston stroke or similar are obtained for each engine operating condition, and stored in advance in the memory of the ECU 26 in map form.

Figure 4:
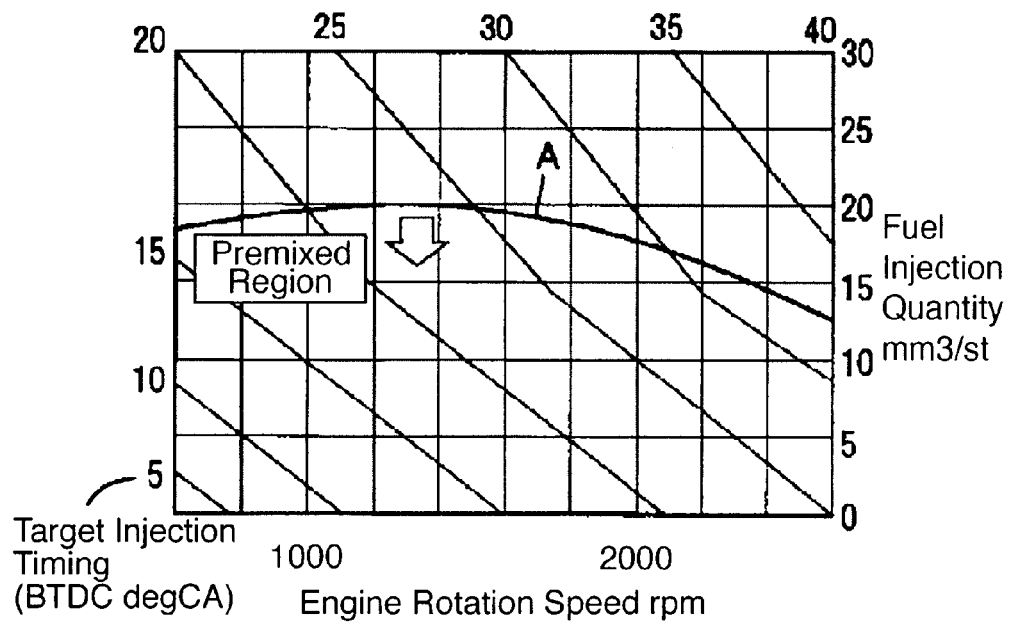
FIG. 4 is a map for determining the fuel injection start timing and the injection quantity.

FIG. 4 specifically shows a map for determining the fuel injection start timing and the injection quantity. The horizontal axis is the engine rotation speed (rpm), the vertical axis is the fuel injection quantity (mm$^3$/st), and the low load area below the switching line A is the region in which premixed combustion is implemented. Also, in practice, the area above the fuel injection quantity corresponding to idling (in the present embodiment 5 mm$^3$/st) is used to exclude zero fuel injection quantity, which corresponds to cutting off the fuel or similar. As can be understood from the figure, in the region in which premixed combustion is implemented, the timing for fuel injection is set within a range of 5 to 35° before top dead center, and as the engine rotation speed and fuel injection quantity (equivalent to the engine load) increase, the fuel injection timing tends to become earlier. When the engine rotation speed is constant, the injection timing becomes earlier as the load increases. This is because as the injection quantity increases it is necessary to increase the premixing period. On the other hand, when the fuel injection quantity is constant, the injection timing becomes earlier as the rotation speed increases. This is because as the rotation speed increases, the piston speed also increases, and to ensure the premixing period, it is necessary to start injection earlier.

Figure 7:
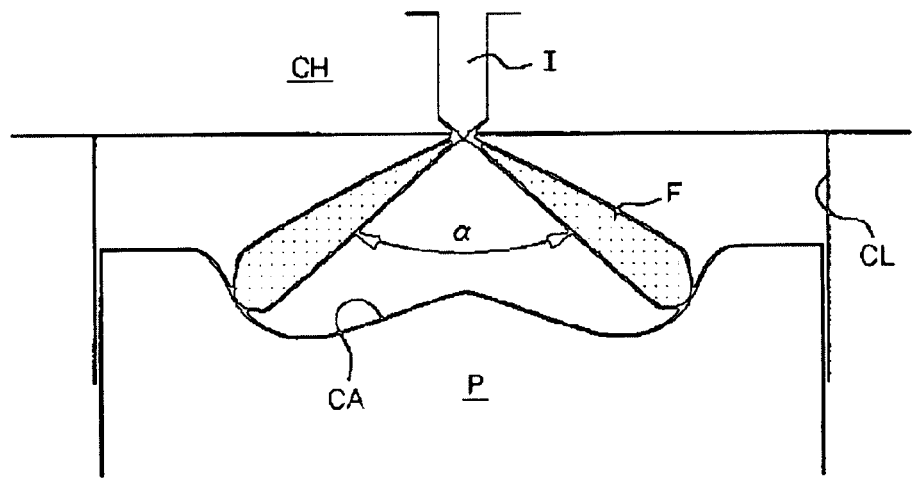
FIG. 7 is a diagram showing an outline of the open-type engine.

In the engine according to the present embodiment that uses an injector 9 with a normal injection angle β (within a range of 140° to 165°), the range within which the fuel injection start timing can be brought forward is of course smaller than the range for an engine for which the injection angle is narrower (see FIG. 7). Therefore, in the engine according to the present embodiment, the fuel is injected with the pressure and temperature in the combustion chamber 10 relatively high (compared with an engine with a narrower injection angle). Therefore, there is a risk that the premixed fuel-air mixture is ignited before the compression top dead center of the piston, and it will not be possible to sufficiently dilute and homogenize the premixed fuel-air mixture.

Therefore, in the engine according to the present embodiment, when premixed combustion is implemented, this problem is avoided by using a relatively large EGR quantity by the EGR device 19.

In other words, in the operating region in which premixed combustion is implemented, the ECU 26 controls the EGR ratio or EGR quantity of the premixed fuel-air mixture using the EGR device 19 to be the EGR ratio or EGR quantity at which the fuel injected by the injector 9 is ignited near the piston 4 compression top dead center after fuel injection is completed. In other words, by reducing the concentration of air in the premixed fuel-air mixture by EGR, sufficient premixing period can be ensured and the timing of ignition is corrected. In the present embodiment, a map that determines the appropriate degree of opening of the EGR valve 21 and the air inlet throttle valve 23 for each engine operating condition is input to the ECU 26 in advance, and the ECU 26 controls the EGR ratio or EGR quantity of the premixed fuel-air mixture by controlling the EGR valve 21 and the air inlet throttle valve 23 according to this map. In the present embodiment, in the operating region in which premixed combustion is implemented, the valve degree of opening map for the EGR valve 21 and the inlet air throttle valve 23 is set so that the EGR ratio of the premixed fuel-air mixture may be 50% or greater.

In this way, by reducing the oxygen concentration in the premixed fuel-air mixture by using a comparatively large quantity of EGR with the EGR device 19, it is possible to ensure sufficient premixing period and promote dilution and homogenization of the premixed fuel-air mixture. Therefore, in the engine according to the present embodiment in which the fuel injection start timing cannot be very early, it is possible to implement good premixed combustion. Also, the EGR ratio or EGR quantity is adjusted so that the ignition timing of the premixed fuel-air mixture is controlled to an appropriate timing (near the compression top dead center of the piston), so the fuel consumption and output are improved. Furthermore, by reducing the oxygen concentration of the premixed fuel-air mixture by implementing a large quantity of EGR, it is possible to reduce NOx in the exhaust gas.

Figure 5:
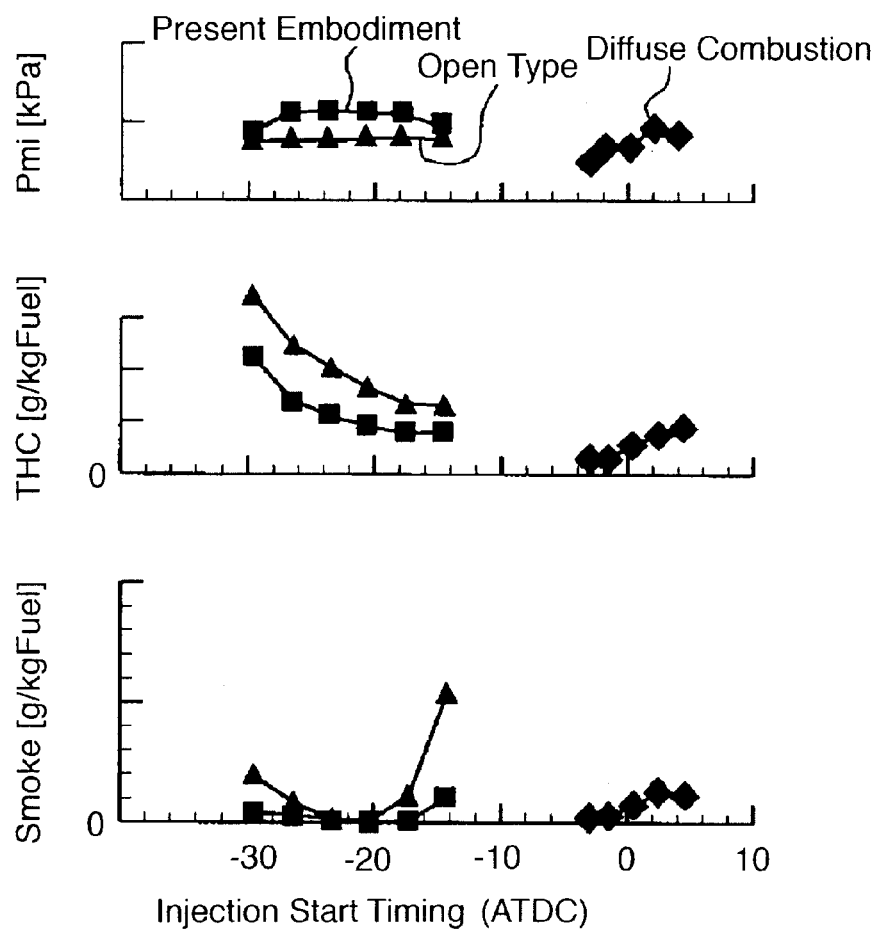
FIG. 5 is a graph showing the detected results for mean effective pressure Pmi, THC emission quantity, and smoke emission quantity in a diesel engine according to one embodiment of the present invention and an open-type engine.

FIG. 5 shows an example of detected results for mean effective pressure Pmi, THC (total hydrocarbon) emission quantity, and smoke emission quantity for the engine according to the present embodiment and an engine using an open-type cavity CA and an injector I with a narrow injection angle α (hereafter referred to as the open-type engine) as shown in FIG. 7.

The horizontal axis in the figure is fuel injection start timing (ATDC), the lines joining the square points in the figure show the detected results for the engine according to the present embodiment, and the lines joining the triangular points show the detected results for the open type engine. The lines joining the diamond shaped points are the detected results for a normal diesel engine with diffuse combustion which are shown for reference.

As can be seen from the figure, the mean effective pressure Pmi (which corresponds to the engine output) for the engine according to the present embodiment is greater than that of the open type engine for all injection start timings.

Also, for the quantity of THC or smoke emissions, for all injection start timings, the emissions were the same or lower than those of the open type engine. A point worthy of special mention is that for the engine according to the present embodiment, the quantity of smoke emissions is low over a wide range of injection start timings. This means that there is a lot of flexibility in setting the injection start timing. In other words, the range of injection start timings in the open type engine, for which the quantity of smoke emissions is low, is narrow (in this example, about −26° to −18° ATDC), so the possible setting range of the injection start timing is narrow, however in the engine according to the present embodiment, there is a wide range of injection start timings for which the quantity of smoke emissions is low (in this example, about −30° to −14° ATDC), so the injection start timing may be freely set within this wide range.

It is believed that the reason why the engine according to the present embodiment is superior with respect to both output and gas emissions compared with the open-type engine is the effect of the reentrant type cavity 11. In other words, with the reentrant type cavity 11, combustion of virtually all the fuel occurs within the cavity 11, and this is thought to result in improved output. Also, with a reentrant cavity 11, it is possible to positively maintain within the cavity 11 the swirl that is formed within the cavity 11, so sufficient dilution and homogenization occurs due to the premixing of the premixed fuel-air mixture. This is considered to lead to the improvement in the exhaust gas. Further, another advantage of the reentrant cavity 11, namely high squish formation, is also considered to contribute to the improvement in the exhaust gas.

Figure 6:
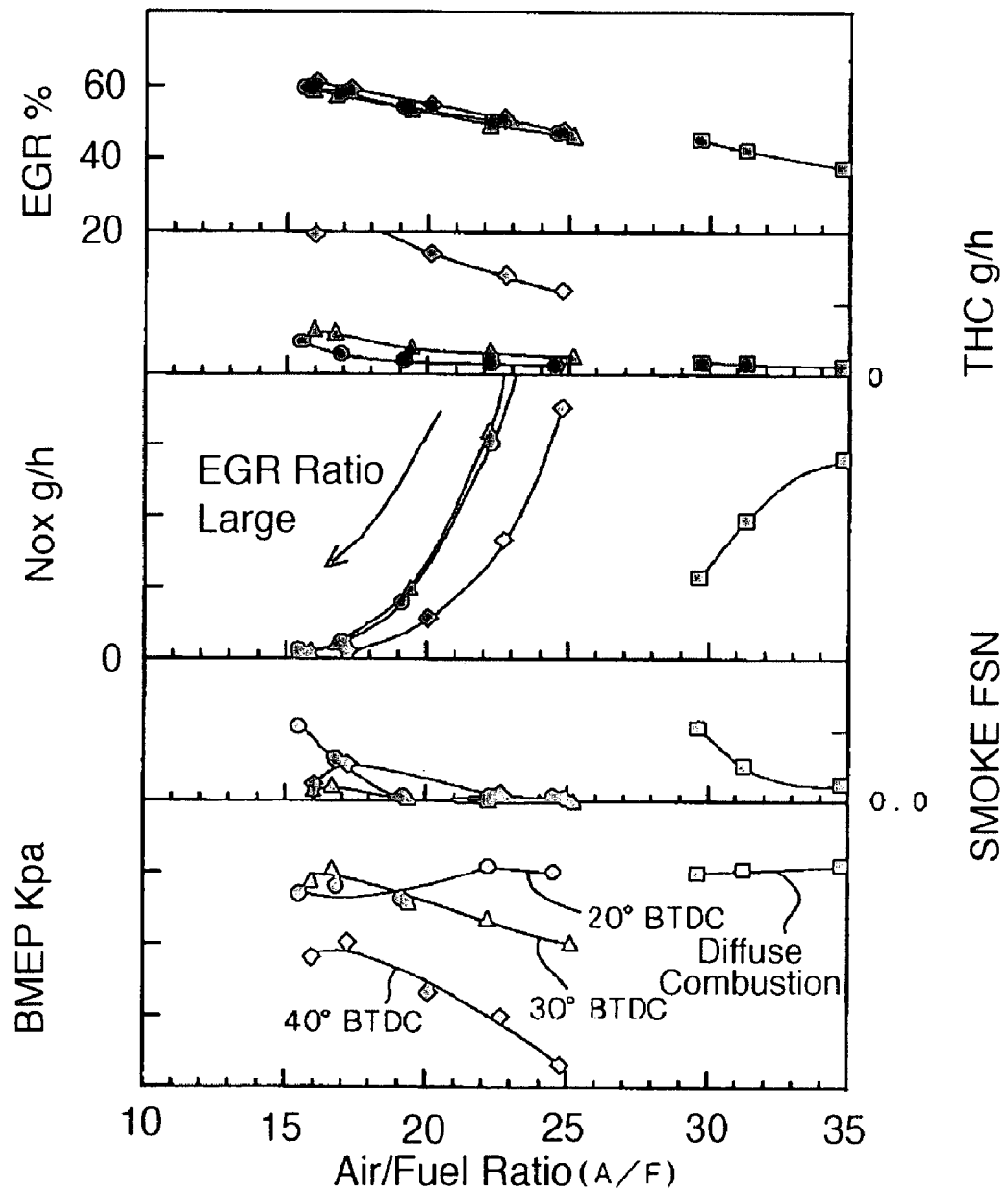
FIG. 6 is a graph showing the detected results for THC emission quantity, NOx emission quantity, smoke emission quantity, and brake mean effective pressure BMEP when the EGR ratio is varied between about 40 to 60%, for three types of settings for the fuel injection start timing in a diesel engine according to one embodiment of the present invention.

FIG. 6 shows an example of the detected results for THC emission quantity, NOx emission quantity, smoke emission quantity, and brake mean effective pressure BMEP (which corresponds to the engine output) when the EGR ratio is varied between about 40 to 60%, for three types of settings for the fuel injection start timing in an engine according to the present embodiment.

The horizontal axis of the figure shows the air to fuel ratio (A/F) of the premixed fuel-air mixture, the higher the EGR ratio of the premixed fuel-air mixture the lower the air to fuel ratio, and the lower the EGR ratio the higher the air to fuel ratio. The lines connecting the circular points in the figure are injection start timing 20° BTDC, the lines connecting the triangular points are injection start timing 30° BTDC, and the lines connecting the diamond shaped points are injection start timing 40° BTDC. The lines connecting the square points are the detected results for a normal diesel engine with diffuse combustion which are shown for reference.

As can be seen from the figure, the THC emission quantity is virtually the same for injection start timing 20° BTDC and 30° BTDC, and only for injection start timing 40° BTDC is the THC emission quantity greatly increased. Also, the brake mean effective pressure BMEP is virtually the same for injection start time 20° BTDC and 30° BTDC, and only for injection start time 40° BTDC is the brake mean effective pressure BMEP greatly reduced.

In this way, when the injection start timing is 40° BTDC, the THC emission quantity and the output are both worse than for injection start timing 20° BTDC and 30° BTDC; it is considered that this is caused by a part of the injected fuel being dispersed from the cavity 11 to the outside.

In other words, in the case of injection start timing 20° BTDC and 30° BTDC, all the injected fuel enters the cavity 11, so both THC emission quantity and output are good, and no large difference can be seen between the two, but in the case of injection start timing 40° BTDC, the injection start timing is too early so a part of the fuel is dispersed outside the cavity 11, and this fuel adheres to the bottom surface of the cylinder head 3 and elsewhere, which results in THC emissions. Also, the fuel that is dispersed outside the cavity 11 cannot burn within the cavity 11, so it may be considered that this results in reduced output.

Next, focusing on the relationship between EGR ratio and exhaust gas and output in FIG. 6, it can be seen that for all injection start timings the higher the EGR ratio, the lower the NOx emission quantity. This is because the oxygen concentration in the premixed fuel-air mixture is reduced by the large quantity of EGR. As can be seen from the figure, in the case of fuel injection start timing 20° BTDC and 30° BTDC, if the EGR ratio is about 50% or greater, the NOx emission quantity may be reduced to virtually zero. For THC emission quantity, smoke emission quantity, and brake mean effective pressure BMEP, no clear correlation with the EGR ratio was observed.

From the detected results in FIG. 6, it can be seen that with an engine according to the present embodiment in which the injection start timing is set so that all the fuel enters the cavity 11 and that has a high EGR ratio (an EGR ratio of 50% or higher), superior exhaust gas characteristics and output can be obtained.

As stated above, the engine according to the present embodiment implements diffuse combustion in the medium and high load region, but the engine according to the present embodiment uses a reentrant type cavity 11 and a normal injector 9 with a comparatively large injection angle β (about 140° to 165°) that are suitable for diffuse combustion, so good combustion can be obtained when implementing diffuse combustion. In other words, when the fuel is injected near compression top dead center to implement diffuse combustion, the injected fuel impacts the side wall of the cavity 11, as in a normal diesel engine, so there is no large scale generation of smoke or the like. Also, because of the reentrant cavity 11, the swirl formed within the cavity 11 can be kept within the cavity 11, so superior exhaust characteristics can be obtained.

Therefore, according to the engine of the present embodiment, in the low load region, good premixed combustion can be realized, and when the diesel engine switches to diffuse combustion in the medium and high load region, good combustion can also be obtained.

Here, it is desirable that the injection angle β of the injector 9 be set as follows, in order to positively implement good diffuse combustion. In other words, the injection angle β is such that the fuel injected near the piston 4 compression top dead center to implement diffuse combustion reaches the inner wall of the cavity on the outside in the radial direction of the lowest position B (see FIG. 3(a)) of the cavity 11. Therefore, if the injection angle β of the injector 9 is made narrower until the angle is just within the range to satisfy this condition, good diffuse combustion can be obtained, as well as when implementing premixed combustion, the fuel injection start timing can be advanced to relatively earlier.

In the diesel engine according to the present embodiment, it is desirable to use a high swirl type cylinder head 3 or air inlet port 5, to further promote mixing of the premixed fuel-air mixture. For example, a swirl generation device may be provided in the air inlet port 5.

Also, an external EGR device in which a part of the exhaust gas within the exhaust pipe 13 is recirculated to the air inlet pipe 12 has been indicated as the EGR device in the embodiment described above. However, the present invention is not limited on this point, and an internal EGR device in which exhaust gas is recirculated to the combustion chamber 10 by controlling the opening and closing of the exhaust valve 8 or the inlet air valve 7 may be used.

The engine according to the present embodiment implements diffuse combustion when the operating conditions of the engine are in the medium and high load regions, so when running (operating) in the medium and high load regions, a small amount of NOx is discharged in the exhaust gas.

Therefore, as shown in FIG. 1, the engine according to the present embodiment is provided with an exhaust gas post-processing device 40 to reduce and purify the NOx contained in the exhaust gas.

The exhaust gas post-processing device 40 includes a catalyst 41 provided in the exhaust pipe 13 (exhaust passage), additive addition means 42 (additive injector) that adds additive to the exhaust gas flowing in the exhaust pipe 13 at the upstream of the catalyst 41, additive storage means 43 (additive tank) that stores additive to be supplied to the additive injector 42, and additive residual quantity detection means 44 is provided in the additive tank 43 to measure the quantity of additive stored within the tank 43.

The catalyst 41 of the exhaust gas post-processing device 40 according to the present embodiment is a selective catalytic reduction catalyst (SCR catalyst), and ammonia solution, urea solution, liquid ammonia, or the like is used as the additive. Alumina (aluminum oxide: $Al_2O_3$), titania (titanium oxide: $TiO_2$), or similar in pellet or honeycomb form may be used as the carrier, and platinum (Pt), vanadium oxide ($V_2O_5$), iron oxide ($Fe_2O_3$), copper oxide (CuO), manganese oxide ($Mn_2O_3$), chromium oxide ($Cr_2O_3$), molybdenum oxide ($MoO_3$), or similar may be used as the active material in the SCR catalyst 41.

Various means may be used as the additive remaining quantity detection means 44, but here a float type level gauge is used.

When the engine operating condition is in the medium or high load region and diffuse combustion is being implemented, if ammonia ($NH_3$) is injected (added) to the exhaust gas by the additive injector 42 of the exhaust gas post-processing device 40, the ammonia ($NH_3$) and the NOx in the exhaust gas react in the SCR catalyst 41 to produce harmless nitrogen ($N_2$) and water ($H_2O$). As stated above, the NOx emission quantity with premixed combustion is virtually zero, so when the engine is operating in the region (low load region) that implements premixed combustion, there is no necessity to operate the exhaust gas post-processing device 40.

However, when there is no additive in the additive tank 43 of the exhaust gas post-processing device 40 which uses additive, the exhaust gas purification effect will of course not be obtained. Therefore, in the diesel engine according to the present embodiment, when there is little additive within the additive tank 43 or when the additive has been fully used up, there is a device that informs the driver of this fact and encourages replenishment with additive.

Specifically, in the diesel engine according to the present embodiment, when the quantity of additive within the additive tank 43 detected by the additive remaining quantity detection means 44 is equal to or less than a predetermined value, warning mans 45 (see FIG. 1) provided at the driver's seat or similar operates to inform the driver of this fact. In the present embodiment, a lamp is used as the warning means 45, but a buzzer or another means may be used, or a plurality of means may be used.

Further, in the diesel engine according to the present embodiment, when the quantity of additive within the additive tank 43 detected by the additive remaining quantity detection means 44 is equal to or less than a predetermined value, premixed combustion is implemented, even if the engine operating condition is outside the region for implementing premixed combustion as described above. Specifically, when the quantity of additive within the additive tank 43 is equal to or less than a predetermined value, the upper bound value of the required torque and fuel injection quantity determined based on the engine rotation speed and the degree of opening of the accelerator and so on is limited to be equal to or less than the maximum required torque and the maximum fuel injection quantity in the region for implementing premixed combustion, and in this way premixed combustion is implemented regardless of the degree of opening of the accelerator.

In this way, by implementing premixed combustion when there is little or no remaining quantity of additive, the level of NOx emissions becomes virtually zero, so even if the purification effect of the exhaust gas post-processing device 40 is lost as a result of insufficient additive, NOx is not emitted to the atmosphere. Also, the required torque and fuel injection quantity are limited, so the engine cannot operate and run as the driver intends, which encourages the driver to quickly replenish the additive. In addition, the engine operation does not completely stop, so the engine can be driven to a place where the additive can be replenished.

Figure 8:
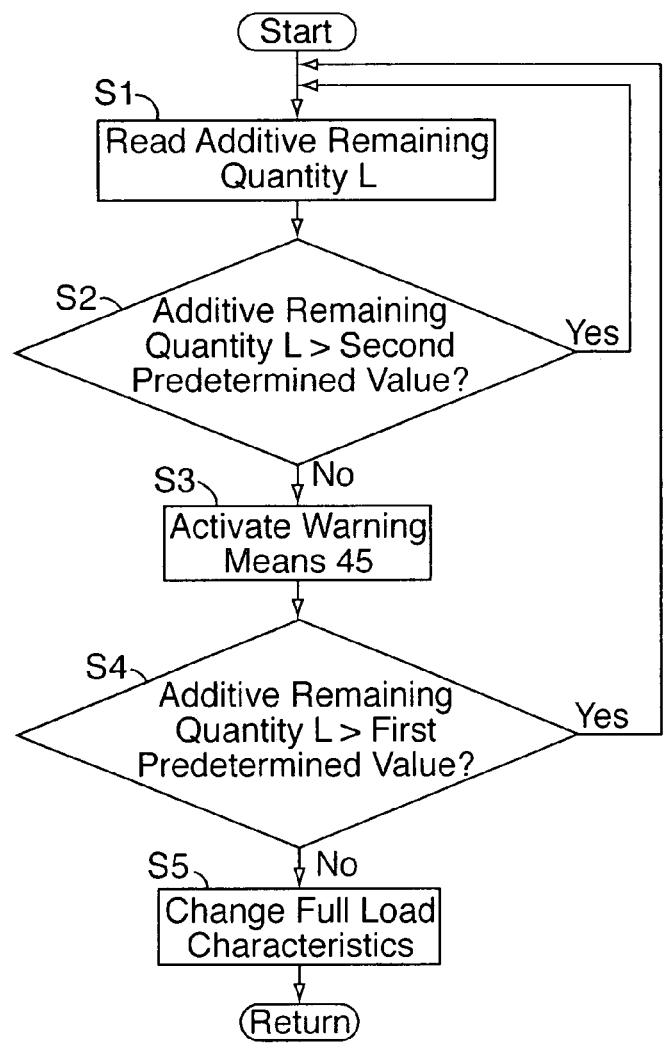
FIG. 8 is a flow diagram of the control executed by the ECU (control device).

The control as explained above is executed by the ECU 26, so the following is an explanation of a specific example of the details of the control executed by the ECU 26 using the flowchart in FIG. 8. This control flow is executed by the ECU 26 in each predetermined period of time.

First, in Step S1, the remaining quantity (level) L of additive in the additive tank 43 detected by the additive remaining quantity detection means 44 is read.

Next, in Step S2, it is determined whether the remaining quantity L of additive read in Step S1 is greater than a predetermined value (corresponding to the second predetermined value in the claims, so hereafter referred to as the second predetermined value) input in advance to the ECU 26.

If it is determined that the remaining quantity L of additive is greater than the second predetermined value (YES), the procedure returns to Step S1, and again the remaining quantity L of additive is read.

In Step S2, if it is determined that the remaining quantity L of additive is equal to or less than the second predetermined value (NO), the routine proceeds to Step S3, and the warning means is operated (in the present embodiment a lamp 45 is turned on). In this way, it is possible to inform the driver that there is little or no additive.

Next, the routine proceeds to Step S4, and it is determined whether the remaining quantity L of additive read in Step S1 is greater than a predetermined value (corresponding to the first predetermined value in the claims, so hereafter is referred to as the first predetermined value) input in advance to the ECU 26. This first predetermined value is set to a value the same or less than the second predetermined value in Step S2.

If it is determined that the remaining quantity L of additive is greater than the first predetermined value (YES), the procedure returns to Step S1, and again the remaining quantity L of additive is read.

On the other hand, if in Step S4 it is determined that the remaining quantity L of the additive is equal to or less than the first predetermined value (NO), the routine proceeds to Step S5, and the engine full load characteristics are changed. If the first predetermined value is set to the same value as the second predetermined value, the determination is certain to be NO in Step S4.

Figure 9A:
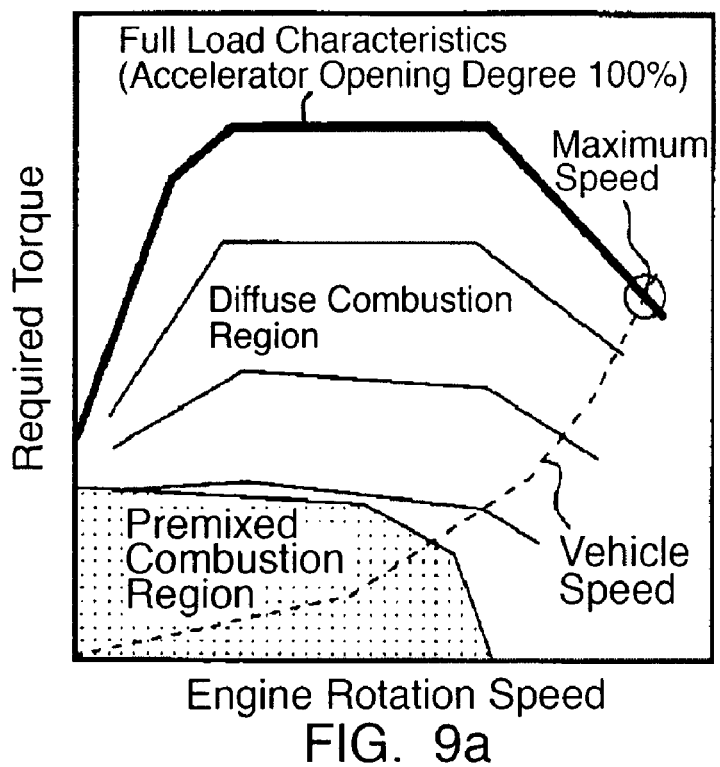
FIG. 9(a) is a schematic diagram of a map that determines the required torque corresponding to the engine rotation speed and the degree of opening of the accelerator under normal conditions.
Figure 9B:
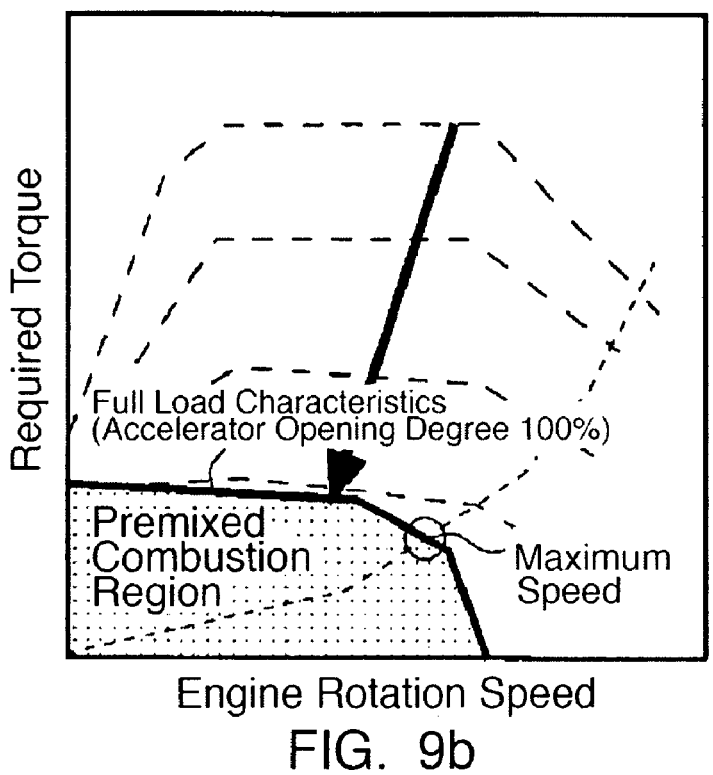
FIG. 9(b) is a schematic diagram of a map that determines the required torque corresponding to the engine rotation speed and the degree of opening of the accelerator under the condition in which the full load characteristic has been changed in Step S5 in FIG. 8.

Here, the change of the engine full load characteristics executed in Step S5 is explained using FIG. 9.

FIG. 9 shows maps in which the required torque (engine output) corresponding to the engine rotation speed and the accelerator opening degree is determined; FIG. 9(*a*) shows normal conditions, and FIG. 9(*b*) shows the condition after the change of the full load characteristics in Step S5.

First, the map for normal conditions is explained using FIG. 9(*a*), the engine operating condition is determined as a single point on the map by the engine rotation speed and the accelerator opening degree. Then, the required torque is determined from the map based on the operating condition. As stated above, the fuel injection quantity is determined based on this required torque, as well as whether to implement premixed combustion or diffuse combustion is determined. As can be seen from the figure, the larger the accelerator opening degree, the larger the required torque setting. Also, the region in which premixed combustion is implemented is set as the region in which the required torque is comparatively low, and the region above this region is the region in which diffuse combustion is implemented.

In FIG. 9(*a*), the topmost line shows the required torque when the accelerator opening degree is maximum (100%), this is the full load characteristic. The broken line in the figure shows an example of change in vehicle speed, and when the accelerator opening degree is 100%, the vehicle speed reaches the maximum speed.

Next, the condition after the full load characteristic is changed is explained using FIG. 9(*b*).

At Step S4 in FIG. 8, when it is determined that the remaining quantity L of additive is equal to or less than the first predetermined value, the ECU 26 changes the engine full load characteristic from that in FIG. 9(*a*) to that in FIG. 9(*b*).

In other words, as can be seen in the figure, the full load characteristic (the required torque characteristic when the accelerator opening degree is 100%) is made to coincide with the maximum values of the premixed combustion region. In this way, the required torque determined from the accelerator opening degree and the engine rotation speed are limited to values within the premixed combustion region. Specifically, if the single point (operating condition) based on the engine rotation speed and the accelerator opening degree is within the premixed combustion region, the required torque is determined in the normal way, but if the single point (operating condition) is outside the premixed combustion region, the required torque is determined to be the maximum required torque in the premixed combustion region for the engine rotation speed at that time. Therefore, regardless of where the driver operates the accelerator opening degree within the range 0 to 100%, the required torque determined from the engine rotation speed and the accelerator opening degree will certainly be a value within the premixed combustion region. Also, by limiting the required torque to be equal to or less than the maximum required torque in the premixed combustion region, the fuel injection quantity determined based on the required torque will also be limited to be equal to or less than the maximum fuel injection quantity in the premixed combustion region.

In this way, in the diesel engine according to the present embodiment, when the remaining quantity of additive in the additive tank 43 is equal to or less than the first predetermined value, premixed combustion is implemented regardless of the degree of opening of the accelerator, and the upper bound values of the required torque and fuel injection quantity are limited to lower than the normal maximum values. In this way, the NOx emission quantity is virtually at the zero level, and NOx is not discharged into the atmosphere even if the purification effect of the exhaust gas of the exhaust gas post-processing device 40 is lost due to the lack of additive. Also, the engine output is limited, so the driver cannot run the engine as intended, and can be encouraged to replenish the additive promptly. In other words, as shown in FIG. 9(*b*), the maximum speed of the vehicle is limited to extremely low compared with normal conditions, so the driver has no option but to replenish with additive.

In the above embodiment, SCR catalyst was prescribed as the active material used in the exhaust gas post-processing device 40, however the present invention is not limited regarding this point, and another type may be used, such as an exhaust gas post-processing device that uses an active material that is independently supplied with respect to the exhaust gas. For example, an oxide/NOx catalyst using hydrocarbon (HC) as the active material that is added to the exhaust gas, or a diesel particulate filter (DPF) with catalyst likewise using hydrocarbon as the active material may be used.

Also, in the embodiment described above, when the remaining quantity of additive is equal to or less than the first predetermined value, the full load characteristic, in other words the upper bound value of the required torque, only was changed, but the present invention is not limited regarding this point, and the overall required torque characteristic in the map shown in FIG. 9(*a*) may be reduced/compressed by a predetermined ratio so that the required torque determined based on the engine rotation speed and the accelerator opening degree is equal to or less than the maximum required torque for the region in which premixed combustion is implemented.

Also, in the embodiment described above, the example was given of torque-based control in which the required torque is determined based on the engine rotation speed and accelerator opening degree, and the fuel injection quantity is determined based on the required torque, however the present invention is not limited regarding this point, and may also be applied to a type in which injection quantity based control is executed, in which the fuel injection quantity is directly determined based on the engine rotation speed and accelerator opening degree. In this case also, when the remaining quantity of additive is equal to or less than the first predetermined value, the upper bound value of the fuel injection quantity determined based on the engine rotation speed and the accelerator opening degree may be limited to be equal to or less than the maximum fuel injection quantity in the region in which premixed combustion is implemented.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A diesel engine comprising:
   a reentrant type cavity depressed in the top of a piston, the cavity having an upper aperture which has a shape that is narrowed down to keep a swirl within the cavity, and having a convex part which rises up formed over the center of the bottom part of the cavity;
   fuel injection means that inject fuel towards the cavity, an injection angle of the fuel injection means being set within a range of 140° to 165° so that fuel injected near the compression top dead center of the piston reaches the internal wall of the cavity on the outside in a radial direction from the convex part of the cavity;
   exhaust gas recirculation means that recirculate a part of the exhaust gas into a combustion chamber; and
   a control device that controls a fuel injection timing by the fuel injection means and an EGR ratio by the exhaust gas recirculation means,
   wherein, when an engine operating condition is in a low load region, the control device starts fuel injection by the fuel injection means within a range of 14° to 30° before a compression top dead center of the piston so that injected fuel impacts the upper aperture of the cavity and enters into the cavity, and completes the fuel injection before the compression top dead center of the piston, while the control device implements the exhaust gas recirculation by the exhaust gas recirculation means at 50% or higher of the EGR ratio so that the recirculated exhaust gas and the inlet air and fuel entered into the cavity are premixed by the swirl in the cavity, and are ignited near the compression top dead center of the piston after premixing to implement premixed combustion.

2. The diesel engine according to claim 1, wherein when the engine operating condition is in a medium or high load region, the control device controls the fuel injection timing by the fuel injection means to be near the compression top dead center of the piston to implement diffuse combustion.

3. The diesel engine according to claim 1, comprising an inlet air port of a high swirl type, or a swirl generation device provided in the inlet air port is comprised to swirl an inlet air brought into the combustion chamber.

4. The diesel engine according to claim 1, further comprising: an exhaust gas post-processing device having a catalyst provided in an exhaust passage, additive addition means that adds additive to an exhaust gas flowing in the exhaust passage upstream of the catalyst, and additive storage means that stores additive that is supplied to the additive addition means; and additive remaining quantity detection means that detects the quantity of additive stored in the additive storage means, wherein when a value detected by the additive remaining quantity detection means is equal to or less than a first predetermined value, the control device implements the premixed combustion even if the engine operation condition is operating in a medium or high load region.

5. The diesel engine according to claim 4, wherein when the value detected by the additive remaining quantity detection means is equal to or less than the first predetermined value, the control device limits a required torque determined based on an engine rotation speed and an accelerator opening degree to be equal to or less than a maximum required torque in the low load region.

6. The diesel engine according to claim 4, wherein when the value detected by the additive remaining quantity detection means is equal to or less than the first predetermined value, the control device limits a fuel injection quantity determined based on an engine rotation speed and an accelerator opening degree to be equal to or less than a maximum fuel injection quantity in the low load region.

7. The diesel engine according to claim 4, further comprising warning means which can be activated by the control device, wherein when the value detected by the additive remaining quantity detection means is equal to or less than a second predetermined value that is set to a value equal to or greater than the first predetermined value, the control device activates the warning means.

8. The diesel engine according to claim 4, wherein the catalyst of the exhaust gas post-processing device is a selective catalytic reduction catalyst, and the additive is aqueous ammonia solution, urea solution, or liquid ammonia.

* * * * *